(12) United States Patent
Sheinin et al.

(10) Patent No.: US 12,086,559 B2
(45) Date of Patent: Sep. 10, 2024

(54) CLAUSE EXTRACTION USING MACHINE TRANSLATION AND NATURAL LANGUAGE PROCESSING

(71) Applicant: International Business Machines Corporation, Armonk, NY (US)

(72) Inventors: Vadim Sheinin, Yorktown Heights, NY (US); Octavian Popescu, Westchester, NY (US); Ngoc Phuoc An Vo, Bronx, NY (US); Irene Lizeth Manotas Gutiérrez, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 17/219,030

(22) Filed: Mar. 31, 2021

(65) Prior Publication Data
US 2022/0318523 A1 Oct. 6, 2022

(51) Int. Cl.
*G06F 40/47* (2020.01)
*G06F 40/205* (2020.01)
*G06F 40/58* (2020.01)

(52) U.S. Cl.
CPC ............ *G06F 40/47* (2020.01); *G06F 40/205* (2020.01); *G06F 40/58* (2020.01)

(58) Field of Classification Search
CPC ........ G06F 40/47; G06F 40/205; G06F 40/58; G06F 40/289; G06F 40/44; G06F 40/45
See application file for complete search history.

(56) References Cited

U.S. PATENT DOCUMENTS

| | | | | |
|---|---|---|---|---|
| 4,821,230 A | * | 4/1989 | Kumano | G06F 40/55 704/6 |
| 5,826,219 A | * | 10/1998 | Kutsumi | G06F 40/211 704/4 |
| 7,447,623 B2 | | 11/2008 | Appleby | |

(Continued)

OTHER PUBLICATIONS

Mehl, Stephan, et al. "Aspects of the translation of English subordinate clauses into German." Int'l Conf. on Theoretical and Methodological Issues in Machine Translation, (1999), pp. 1-10 (Year: 1999).*

(Continued)

*Primary Examiner* — Andrew C Flanders
*Assistant Examiner* — Michael C. Lee
(74) *Attorney, Agent, or Firm* — Edell, Shapiro & Finnan, LLC

(57) ABSTRACT

A computer system extracts clauses using machine translation. An input sentence in a source language is translated into a translated sentence in a target language using a trained machine translation model, wherein the trained machine translation model inserts a grammatical indicator into a position of the translated sentence that identifies a dependent clause. The input sentence and the translated sentence are aligned to determine a position in the input sentence that corresponds to the position of the grammatical indicator in the translated sentence. The dependent clause is extracted, in the source language, from the input sentence based on the determined position in the input sentence. Embodiments of the present invention further include a method and program product for clause extraction using machine translation in substantially the same manner described above.

17 Claims, 6 Drawing Sheets

(56) References Cited

U.S. PATENT DOCUMENTS

| | | | |
|---|---|---|---|
| 9,940,324 B2 | 4/2018 | Bahgat et al. | |
| 10,846,487 B2 | 11/2020 | Lee | |
| 10,872,207 B2 | 12/2020 | Mochida et al. | |
| 2004/0254781 A1* | 12/2004 | Appleby | G06F 40/45 704/2 |
| 2005/0055217 A1 | 3/2005 | Sumita et al. | |
| 2007/0282590 A1* | 12/2007 | Suzuki | G06F 40/253 704/2 |
| 2008/0097743 A1* | 4/2008 | Hong | G06F 40/58 704/3 |
| 2008/0208565 A1 | 8/2008 | Bisegna | |
| 2008/0228464 A1* | 9/2008 | Al-Onaizan | G06F 40/58 704/3 |
| 2008/0288474 A1* | 11/2008 | Chin | G06F 16/951 |
| 2010/0070261 A1* | 3/2010 | Jin | G06F 40/51 704/2 |
| 2010/0274552 A1* | 10/2010 | Gao | G06F 40/51 704/2 |
| 2011/0307245 A1* | 12/2011 | Hanneman | G06F 40/45 704/4 |
| 2014/0288915 A1* | 9/2014 | Madnani | G06F 40/58 704/2 |
| 2014/0358524 A1 | 12/2014 | Papula et al. | |
| 2017/0060855 A1* | 3/2017 | Song | G06F 40/55 |
| 2018/0039859 A1* | 2/2018 | Harwath | G06V 10/82 |
| 2020/0026761 A1 | 1/2020 | Kamijoh et al. | |
| 2020/0034436 A1* | 1/2020 | Chen | G06N 3/0454 |
| 2021/0073480 A1* | 3/2021 | Mehta | G06F 40/58 |
| 2021/0174019 A1* | 6/2021 | Jiang | G06F 40/263 |

OTHER PUBLICATIONS

Gimpel, Kevin, et al. "Phrase Dependency Machine Translation with Quasi-Synchronous Tree-to-Tree." Computational Linguistics 1.1. (2014) pp. 349-401 (Year: 2014).*

Al-Onaizan, Y, et al. "Distortion models for statistical machine translation." In Proceedings of the 21st International Conference on Computational Linguistics and 44th Annual Meeting of the Association for Computational Linguistics (2006), pp. 529-536 (Year: 2006).*

Meera, M.. "Multilingual machine translation with semantic and disambiguation." 2014 Fourth International Conference on Advances in Computing and Communications. IEEE, 2014, pp. 223-226. (Year: 2014).*

Gu, Jiatao, et al. "Non-autoregressive neural machine translation." arXiv preprint arXiv: 1711.02281 (Mar. 9, 2018), pp. 1-13 (Year: 2018).*

Hoang, Vu Cong Duy, et al. "Iterative back-translation for neural machine translation." Proceedings of the 2nd workshop on neural machine translation and generation. 2018, pp. 18-24 (Year: 2018).*

Pham, Ngoc-Quan, et al. "Kit's multilingual neural machine translation systems for iwslt 2017." Proceedings of the 14th International Conference on Spoken Language Translation. 2017, pp. 42-47 (Year: 2017).*

* cited by examiner

300

If(1) the(2) temperature(3) is(4) high(5) shut(6) off(7) the(8) valve(9). (English)

Wenn(1) die(2) Temperatur(3) hoch(4) ist(5), das(6) Ventil(7) schließen(8). (German)

| ENGLISH | GERMAN |
|---|---|
| 1 | 1 |
| 2 | 2 |
| 3 | 3 |
| 4 | 5 |
| 5 | 4 |
| 6 | 8 |
| 7 | 8 |
| 8 | 6 |
| 9 | 7 |

If(1) the(2) temperature(3) is(4) high(5) shut(6) off(7) the(8) valve(9). (English)

Если(1) температура(2) высокая(3), закройте(4) вентиль(5). (Russian)

| ENGLISH | RUSSIAN |
|---------|---------|
| 1 | 1 |
| 2 | - |
| 3 | 2 |
| 4 | - |
| 5 | 3 |
| 6 | 4 |
| 7 | 4 |
| 8 | - |
| 9 | 5 |

CLAUSE EXTRACTION USING MACHINE TRANSLATION AND NATURAL LANGUAGE PROCESSING

BACKGROUND

1. Technical Field

Present invention embodiments relate to natural language processing, and more specifically, to extracting clauses from sentences using machine translation and natural language processing techniques.

2. Discussion of the Related Art

Natural language processing is a subfield of linguistics, computer science, and artificial intelligence in which the interactions between computers and human language are analyzed. A focus of natural language processing is to enable computers to process and analyze large volumes of natural language data in order to obtain an understanding of the meaning and content of human communications. Some natural language samples may be more difficult for a natural language processing model to accurately process due to features such as complexity of the sentence or particular syntactical constructions.

SUMMARY

According to one embodiment of the present invention, a computer system extracts clauses using machine translation. An input sentence in a source language is translated into a translated sentence in a target language using a trained machine translation model, wherein the trained machine translation model inserts a grammatical indicator into a position of the translated sentence that identifies a dependent clause. The input sentence and the translated sentence are aligned to determine a position in the input sentence that corresponds to the position of the grammatical indicator in the translated sentence. The dependent clause is extracted, in the source language, from the input sentence based on the determined position in the input sentence. Embodiments of the present invention further include a method and program product for clause extraction using machine translation in substantially the same manner described above. Thus, natural language processing techniques are provided that enable improved clause extraction in multi-clause sentences that may be ambiguous.

Various other embodiments of the present invention will now be discussed. In some embodiments, the dependent clause is selected from a group of: a relative clause, a conditional clause, a temporal clause, an adverbial clause, an adjectival clause, and a nominal clause. Thus, present invention embodiments extend to different types of dependent clauses. In some embodiments, the source language is English. By training the machine learning models to extract clauses from English language samples, present invention embodiments can support a language that is internationally popular and that can be ambiguous. In some embodiments, the target language is selected from a group of: German, Russian, Polish, Czech, and Slovak. Thus, present invention embodiments utilize grammatical and syntactical attributes of these languages to extract clauses from sentences originally presented in other languages. In some embodiments, determining the position in the input sentence comprises identifying words of the dependent clause in the translated sentence and the corresponding words of the dependent clause in the input sentence based on the aligning of the input sentence and the translated sentence, and the extracting of the dependent clause comprises extracting the identified corresponding words in the input sentence. Thus, present invention embodiments extract clauses from input sentences by utilizing word alignment techniques and clause extraction in target sentences. In some embodiments, the dependent clause is further identified in the translated sentence by identifying a subordinating conjunction and by identifying a finite verb occupying a position immediately prior to the position of the grammatical indicator. Thus, present invention embodiments can ensure that clauses are correctly identified in a translated sentence in order to increase the accuracy of clause extraction in input sentences. In some embodiments, the grammatical indicator comprises a comma. Thus, present invention embodiments support the training of natural language processing models without having to manually edit natural language samples in the target languages.

BRIEF DESCRIPTION OF THE DRAWINGS

Generally, like reference numerals in the various figures are utilized to designate like components.

FIG. 3A is a block diagram depicting an example input sentence and corresponding translated sentence with sequential numbering of words in accordance with an embodiment of the present invention;

FIG. 3B is a table depicting an alignment of the words in a translated sentence to the corresponding words in an input sentence;

FIG. 3C is a block diagram depicting an example input sentence and corresponding translated sentence with sequential numbering of words in accordance with an embodiment of the present invention;

FIG. 3D is a table depicting an alignment of the words in a translated sentence to the corresponding words in an input sentence;

DETAILED DESCRIPTION

Figure 1:
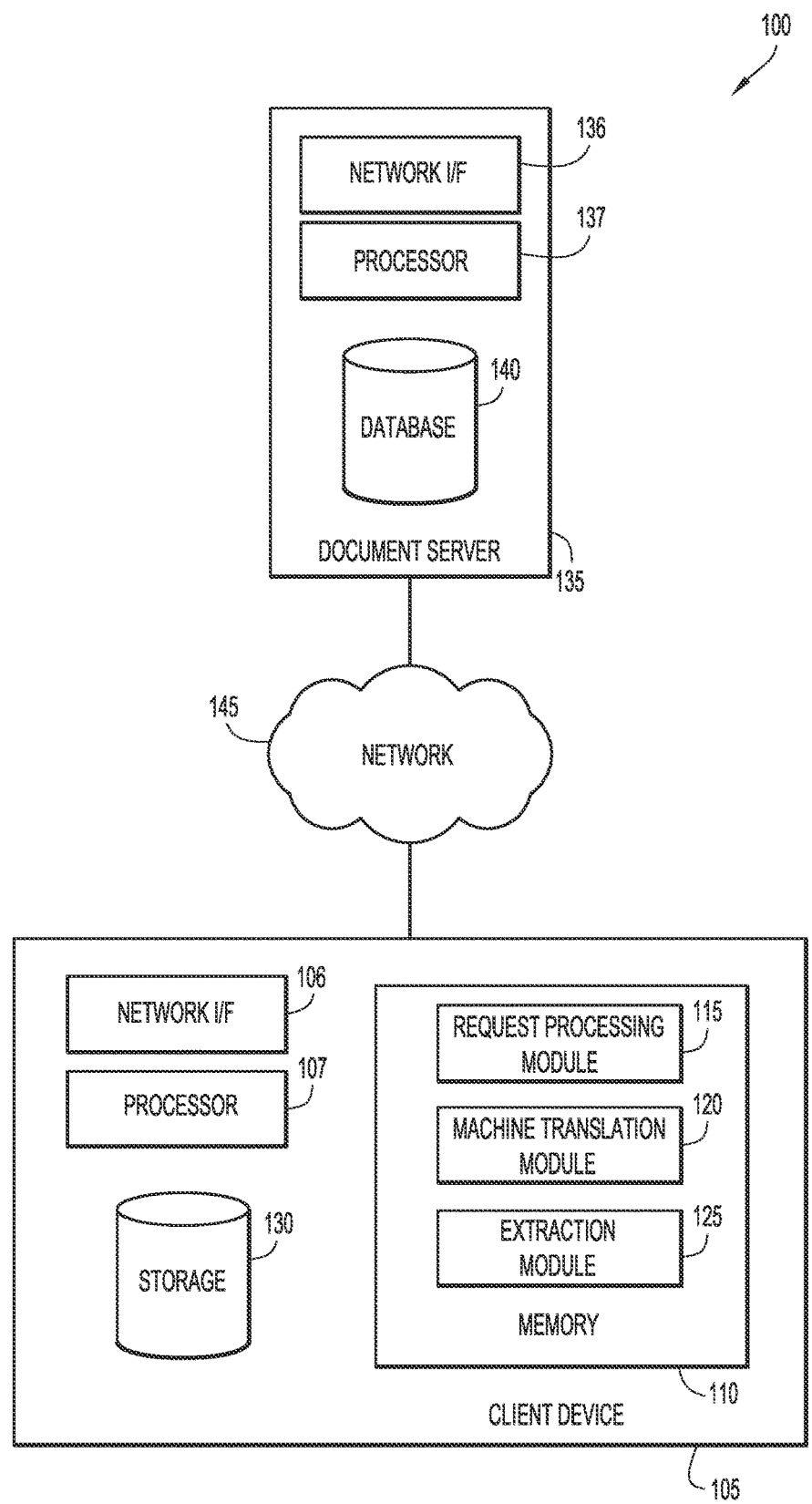
FIG. 1 is a block diagram depicting a computing environment for clause extraction using machine translation in accordance with an embodiment of the present invention.

Present invention embodiments relate to natural language processing, and more specifically, to extracting clauses from sentences using machine translation techniques. Complete sentences can include two different types of clauses: independent clauses and dependent clauses (also known as subordinate clauses). Whereas independent clauses can stand alone as a grammatically-complete sentence, dependent clauses cannot. For example, in the sentence "if it is raining, I will stay inside," the independent clause "I will stay inside" expresses a complete thought by itself, whereas "if it is raining" does not express a complete thought. In the field of natural language processing, multi-clause sentences can be particularly difficult to process because the clauses must be identified and further, their relationships to each other must be determined.

Accordingly, presented herein are techniques that provide a novel approach to extracting individual clauses from multi-clause sentences. Conventional approaches to clause extraction typically analyze sentences using methods that are based on the grammar and syntax of the language. In contrast, present invention embodiments employ machine translation to translate a multi-clause sentence from one language to another language in order to better facilitate clause extraction in the original sentence. For example, English sentences can be translated into another language, such as German or Russian, that requires inclusion of a comma to explicitly denote any dependent clauses by virtue of that language's grammar and syntax. Based on the comma's position in the German or Russian sentence, clauses in the English sentence can then be readily identified and extracted.

Thus, present invention embodiments improve the technical field of natural language processing by providing techniques for increasing the accuracy of clause extraction while reducing the computation time and processing resources that conventional approaches require. Present invention embodiments provide the practical application of greatly improving any natural language processing model so that such models can achieve better understanding of the ambiguities of often-ambiguous languages such as English. Additionally, clause extraction is accomplished using unconventional techniques that analyze translated versions of multi-clause sentences in order to extract clauses from the sentences in their original language.

Various other embodiments of the present invention will now be discussed. In some embodiments, the dependent clause is selected from a group of: a relative clause, a conditional clause, a temporal clause, an adverbial clause, an adjectival clause, and a nominal clause. Thus, present invention embodiments extend to different types of dependent clauses. In some embodiments, the source language is English. By training the machine learning models to extract clauses from English language samples, present invention embodiments can support a language that is internationally popular and that can be ambiguous. In some embodiments, the target language is selected from a group of: German, Russian, Polish, Czech, and Slovak. Thus, present invention embodiments utilize grammatical and syntactical attributes of these languages to extract clauses from sentences originally presented in other languages. In some embodiments, determining the position in the input sentence comprises identifying words of the dependent clause in the translated sentence and the corresponding words of the dependent clause in the input sentence based on the aligning of the input sentence and the translated sentence, and the extracting of the dependent clause comprises extracting the identified corresponding words in the input sentence. Thus, present invention embodiments extract clauses from input sentences by utilizing word alignment techniques and clause extraction in target sentences. In some embodiments, the dependent clause is further identified in the translated sentence by identifying a subordinating conjunction and by identifying a finite verb occupying a position immediately prior to the position of the grammatical indicator. Thus, present invention embodiments can ensure that clauses are correctly identified in a translated sentence in order to increase the accuracy of clause extraction in input sentences. In some embodiments, the grammatical indicator comprises a comma. Thus, present invention embodiments support the training of natural language processing models without having to manually edit natural language samples in the target languages.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for clause extraction using machine translation in accordance with an embodiment of the present invention. As depicted, computing environment 100 includes a client device 105, a document server 135, and a network 145. It is to be understood that the functional division among components of computing environment 100 have been chosen for purposes of explaining present invention embodiments and is not to be construed as a limiting example.

Client device 105 includes a network interface (I/F) 106, at least one processor 107, memory 110, and storage 130. Memory 110 includes a request processing module 115, a machine translation module 120, and an extraction module 125. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 145. In general, client device 105 processes samples of natural language to extract individual clauses from multi-clause sentences. Client device 105 may include internal and external hardware components, as depicted and described in further detail with respect to FIG. 5.

Request processing module 115, machine translation module 120, and extraction module 125 may include one or more modules or units to perform various functions of present invention embodiments described below. Request processing module 115, machine translation module 120, and extraction module 125 may be implemented by any combination of any quantity of software and/or hardware modules or units, and may reside within memory 110 of client device 105 for execution by a processor, such as processor 107.

Request processing module 115 processes user requests for natural language processing tasks that require clause extraction. In particular, request processing module 115 may receive requests indicating specific natural language samples to be processed, such as a sentence, a paragraph, a website, a book, and the like. Request processing module 115 may then obtain the requested language sample from one or more locations, such as storage 130 of client device 105 or network-accessible locations like database 140 of document server 135. Once a natural language sample is obtained, request processing module 115 may provide machine translation module 120 and/or extraction module 125 with the natural language sample to be processed in accordance with present embodiments. Once clause extraction is performed, request processing module 115 may include the extracted clauses in a response to the request, which can be transmitted to a network-accessible location, presented to a user of client device 105, or utilized for additional natural language processing tasks.

Machine translation module 120 may translate natural language samples from an original language, referred to herein as a source language, to another language, referred to herein as a target language. In some embodiments, the source language is English, and the target language includes German or Russian. In some embodiments, the target language can include any language from the Slavic language family, such as Polish, Czech, Slovak, Bosnian, Croatian, or Serbian.

Machine translation module 120 employs one or more trained machine learning models to automatically perform source-to-target language translation. Machine translation module 120 can include any conventional or other machine learning techniques, such as deep learning or representation learning, and may employ models such as recurrent neural networks, convolutional neural networks, attention-based models, and the like. Machine translation module 120 can be trained using a training corpus of sentences in a source language and corresponding translations of those sentences in the desired target language.

In particular, machine translation module 120 may be trained using a training corpus that includes examples of multi-clause sentences that are ambiguous as to the presence of multiple clauses, and corresponding grammatically-correct translated sentences in the target language. Multi-clause sentences in English can be ambiguous when a dependent clause is not separated by a comma. For example, the sentence "when it is sunny I like to walk outside" and "when it is sunny, I like to walk outside" are both considered to be correct in English as the comma is optional. However, clause extraction is facilitated by the presence of a comma. The training corpus provided to machine translation module 120 includes examples in the target language that, by grammar requirements of the target language itself, require the presence of commas to indicate dependent clauses.

Thus, machine translation module 120 can translate English multi-clause sentences that do not possess a comma delineating the clauses into a target language in which the comma is present. For example, machine translation module 120 may translate the input sentence "if the temperature is high shut off the valve" into a German sentence "Wenn die Temperatur hoch ist, das Ventil schließen" that includes a comma. Both sentences can then be provided to extraction module 125 for further processing.

Extraction module 125 processes an input sentence and its corresponding translated sentence to determine a position in the input sentence that corresponds to the position in the translated sentence in which a comma is present to indicate the separation of clauses. Accordingly, the determined position in the input sentence can be used to extract individual clauses from the input sentence as if the input sentence had originally been provided with a grammatical indicator (e.g., a comma) showing the separate clauses. Extraction module 125 may extract clauses by identifying the clauses in the translated sentence, performing word alignment to align the translated sentence to the input sentence, and determining the position in the input sentence that corresponds to the comma in the translated sentence.

Extraction module 125 can identify clauses in the translated sentence based on grammatical and/or syntactical cues inherent to the target language of the translated sentence. In particular, target languages may require that dependent clauses always start with a specific word or phrase, and terminate with a comma. Dependent clauses can start with a word or phrase that is a subordinating conjunction of the target language, such as the word "wenn" ("if" in English) for a target language that is German or "когда/Если" ("when/if" in English) for a target language that is Russian. When a translated sentence includes multiple commas, extraction module 125 can identify the correct comma indicating the end of a dependent clause if the comma is adjacent to a finite verb, which is a verb form that shows agreement with a subject and is marked for tense, as is the case in German. Thus, for example, an infinitive is not a finite verb form, and therefore an infinitive followed by a comma would preclude the comma from being considered as indicating the end of a dependent clause.

Once extraction module 125 identifies a dependent clause in the translated sentence, extraction module 125 performs word alignment, which determines how words in the translated sentence correspond to words in the input sentence. For each word in the translated sentence, a corresponding word may be found in the input sentence, if such a corresponding word exists. Extraction module 125 may employ any conventional or other word alignment techniques, including rules-based approaches and/or machine learning approaches. For example, extraction module 125 may utilize any bitext word alignment techniques. In some embodiments, extraction module 125 utilizes statistical machine translation to train an alignment model and/or translation model. In other embodiments, extraction module 125 utilizes a Hidden Markov model to perform alignment.

Extraction module 125 extracts clauses from the input sentence by determining the position in the input sentence that corresponds to the comma in the translated sentence. Once the input sentence is aligned with the translated sentence, the position of the comma in the translated sentence can be used, based on the alignment, to determine a corresponding position in the input sentence. Extraction module 125 may then extract the dependent clause from the input sentence similarly to how extraction is accomplished for translated sentences: a dependent clause may be identified as the portion of a sentence that begins with a subordinating conjunction and ends at the position determined to correspond to the comma. Thus, extraction module 125 can identify and extract both dependent and independent clauses from a multi-clause sentence, which can be used to support additional natural language processing tasks. Another approach to dependent clause extraction in input sentences and/or translated sentences can be based on deep learning techniques.

In some embodiments, clause extraction may be implemented server-side by document server 135 and/or other servers. For example, client device 105 may send a request to a server, which performs clause extraction and transmits extracted clauses back to client device 105.

Storage 130 may include any non-volatile storage media known in the art. For example, storage 130 can be implemented with a tape library, optical library, one or more independent hard disk drives, or multiple hard disk drives in a redundant array of independent disks (RAID). Similarly, data in storage 130 may conform to any suitable storage architecture known in the art, such as a file, a relational database, an object-oriented database, and/or one or more tables. In some embodiments, storage 130 can store natural language samples, input sentences, translated sentences, results of natural language processing, trained machine learning models, and/or training corpora for machine learning models.

Document server 135 includes a network interface (I/F) 136, at least one processor 137, and a database 140. Document server 135 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 136 enables components of document server 135 to send and receive data over a network, such as network 145. In general, document server 135 can store any samples of natural language, such as fiction, non-fiction, human speech converted to text, and the like. Document server 135 may include internal and external hardware components, as depicted and described in further detail with respect to FIG. 5.

Database 140 may include any non-volatile storage media known in the art. For example, database 140 can be implemented with a tape library, optical library, one or more independent hard disk drives, or multiple hard disk drives in a redundant array of independent disks (RAID). Similarly, data in database 140 may conform to any suitable storage architecture known in the art, such as a file, a relational database, an object-oriented database, and/or one or more tables. In some embodiments, database 140 may store data relating to natural languages, which can be used to train machine learning models and/or may be used as input for clause extraction requests. In some embodiments, results of clause extraction are provided to database 140.

Network 145 may include a local area network (LAN), a wide area network (WAN) such as the Internet, or a combination of the two, and includes wired, wireless, or fiber optic connections. In general, network 145 can be any combination of connections and protocols known in the art that will support communications between client device 105 and document server 135 via their respective network interfaces in accordance with embodiments of the present invention.

Figure 2:
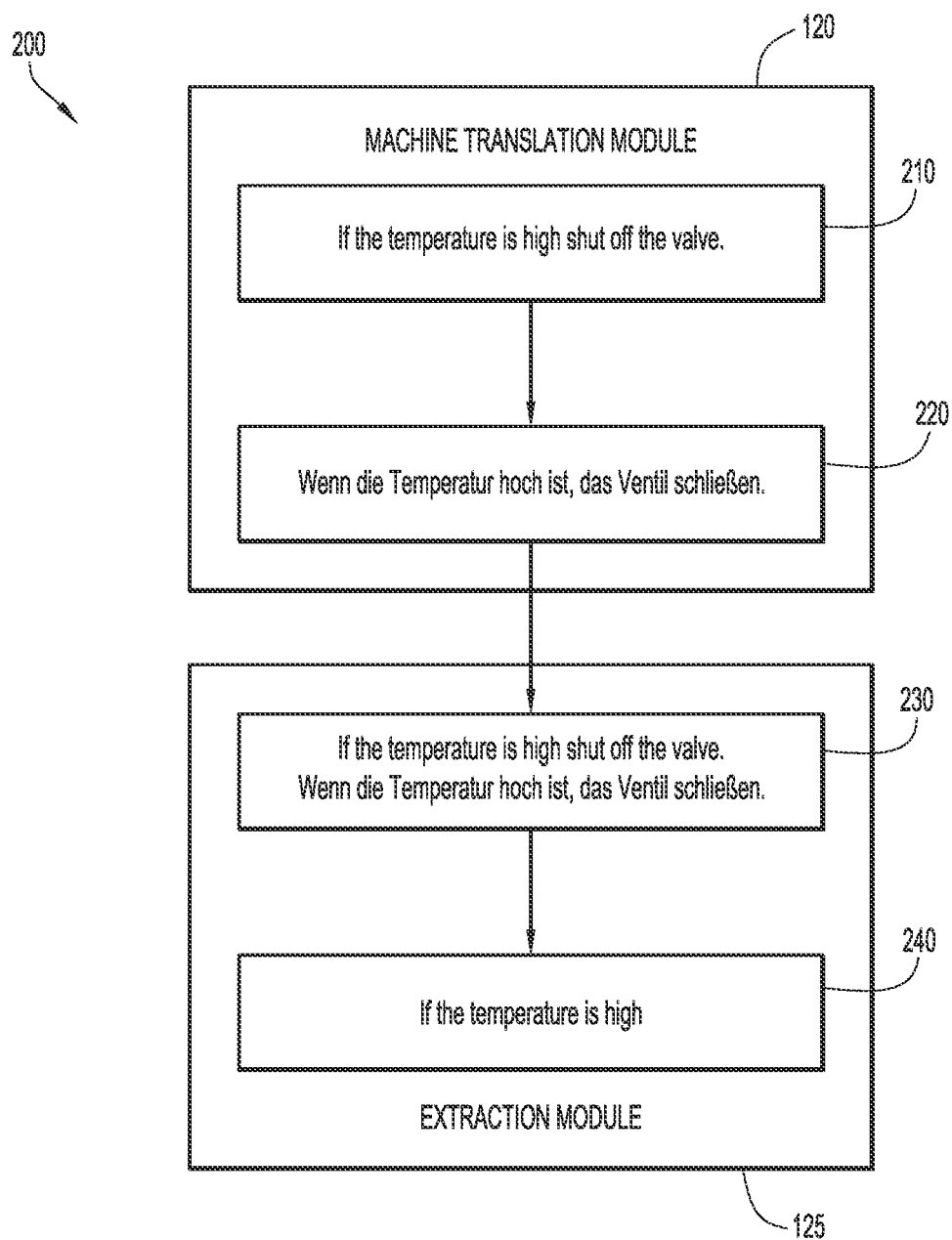
FIG. 2 is a block diagram depicting a clause being extracted from a sentence in accordance with an embodiment of the present invention.

FIG. 2 is a block diagram 200 depicting a clause being extracted from an example sentence in accordance with an embodiment of the present invention. At block 210, an input sentence in English ("If the temperature is high shut off the valve.") is provided to machine translation module 120, which processes the input sentence to yield a translated sentence in a target language of German ("Wenn die Temperatur hoch ist, das Ventil schließen."), depicted at block 220. By applying machine translation module 120 to the input sentence, which is ambiguous with respect to the presence of multiple clauses, the resulting translated sentence includes a grammatical indicator indicating the division between clauses, which is required by German grammar and is denoted using a comma.

Both the input sentence and the translated sentence are provided to extraction module 125, as shown in block 230. Extraction module then aligns the two sentences to determine the position in the input sentence that corresponds to the position of the comma in the translated sentence, and extracts the dependent clause, as shown at block 240. Word alignment is depicted and described in further detail below with respect to FIGS. 3A-3D.

FIG. 3A is a block diagram 300 depicting an example input sentence and corresponding translated sentence with sequential numbering of words in accordance with an embodiment of the present invention. Words are assigned numbers in order to describe and represent the mappings of words during alignment, and it should be appreciated that present invention embodiments may not require labeling of words with numbers in order to perform alignment. In the translated sentence, the dependent clause ("Wenn die Temperatur hoch ist") is indicated by underlining.

FIG. 3B is a table 305 depicting an alignment of the words in a translated sentence to the corresponding words in an example input sentence. Each cell of table 305 contains a word from the corresponding sentence in block diagram 300, and the rows indicate mappings of input sentence words (English words) and translated sentence words (German) as numbered according to FIG. 3A. Thus, the first word in the English sentence ("If") maps to the first word in the German sentence ("Wenn"), and the fourth word in the English sentence ("is") maps to the fifth word in the German sentence ("ist"). Table 305 is sorted according to the sequential numbering of the English sentence, and the German sentence is thus mapped to the English sentence (rather than mapping the English sentence to the German sentence).

In order to determine the position in the input sentence that corresponds to the position of the comma in the translated sentence, all of the words of the dependent clause in the German sentence are selected, along with their corresponding aligned English words, as illustrated by boundary 310. Next, out of the subset of words in the input sentence that correspond to the selected words from the dependent clause in the translated sentence, the word having the highest sequential number is selected. In the depicted example, the fifth word is selected, as indicated by label 315, as five is the highest number in the "English" column of the subset included in boundary 310. Accordingly, the position in the English sentence that corresponds to the position of the comma in the German sentence is immediately after the fifth word (i.e., the word "high").

FIG. 3C is a block diagram 320 depicting an example input sentence and corresponding translated sentence with sequential numbering of words in accordance with an embodiment of the present invention. The words of an input sentence in English and a translated sentence in Russian are assigned numbers in sequential order. In the translated sentence, the dependent clause (" Если температура высокая ") is indicated by underlining.

FIG. 3D is a table 325 depicting an alignment of the words in a translated sentence to the corresponding words in an example input sentence. Each cell of table 325 contains a word from the corresponding sentence in block diagram 320, and the rows indicate mappings of input sentence words (English words) and translated sentence words (Russian) as numbered according to FIG. 3A. Thus, the first word in the English sentence ("If") maps to the first word in the Russian sentence (" Если "), and the third word in the English sentence ("temperature") maps to the second word in the Russian sentence (" температура "). The Russian language does not include some counterparts that are included in English (as some words may be omitted or merged), so there is no Russian word to map to the second, fourth, or eighth English word. Table 325 is sorted according to the sequential numbering of the English sentence, and the Russian sentence is thus mapped to the English sentence.

In order to determine the position in the input sentence that corresponds to the position of the comma in the translated sentence, all of the words of the dependent clause in the Russian sentence are selected, along with their corresponding aligned English words, as illustrated by boundary 330. Next, out of the subset of English words in the input sentence that correspond to the selected words from the dependent clause in the translated sentence, the word having the highest sequential number is selected. In the depicted example, the fifth word is selected, as indicated by label 335, as five is the highest number in the "English" column of the subset included in boundary 330. Accordingly, the position in the English sentence that corresponds to the position of the comma in the Russian sentence is after the fifth word ("high").

Figure 4:
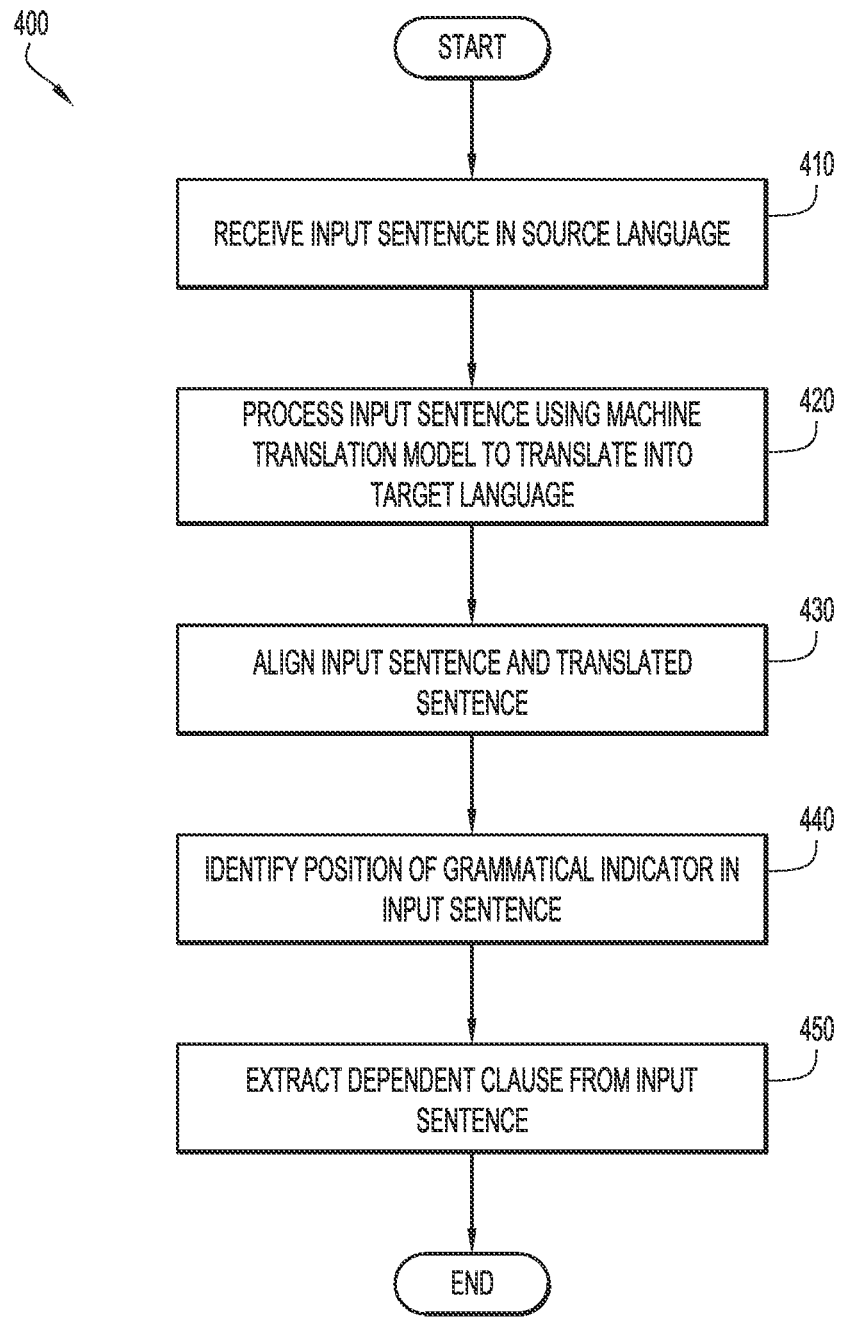
FIG. 4 is a flow chart depicting a method of extracting clauses in accordance with an embodiment of the present invention.

FIG. 4 is a flow chart depicting a method 400 of extracting clauses in accordance with an embodiment of the present invention.

An input sentence is received in a source language at operation 410. The input sentence may be provided by user selection via request processing module 115. The input sentence may include an English-language sentence, and may be ambiguous with respect to the presence of multiple clauses in the sentence. For example, the sentence may include a conditional clause, a relative clause, or a temporal clause that is not denoted by a comma and is thus difficult for natural language processing models to identify for extraction.

The input sentence is processed using a machine translation model to translate the input sentence into a target language at operation 420. Machine translation module 120 generates a translated sentence that corresponds to the input sentence and that is in a target language, such as Russian, German, or a Slavic language. Machine translation module 120 is further trained to insert a grammatical indicator, such as a comma, indicating the presence of a dependent clause in the translated sentence. In some embodiments, machine translation module 120 translates the input sentence into two or more languages.

The input sentence and the translated sentence are aligned at operation 430. Extraction module 125 maps the words in the translated sentence to corresponding words in the input sentence using conventional or other word alignment techniques.

The position in the input sentence that corresponds to the position of the grammatical indicator in the translated sentence is identified at operation 440. Extraction module 125 may determine the position in the input sentence by identifying the word in the translated sentence that is adjacent to the grammatical indicator, determining which word in the input sentence corresponds to that word, and then identifying the position of that word in the input sentence. In some embodiments, extraction module 125 uses multiple translated sentences to determine a correct position in the input sentence; for example, multiple translated sentences can be processed to verify that the determined position in the input sentence is correct, or a best estimate of the correct position can be made by selecting the position indicated by the majority of the processed translated sentences.

A dependent clause is extracted from the input sentence at operation 450. Extraction module 125 identifies the dependent clause in the input sentence, thus enabling the dependent clause to be isolated from the independent clause of the input sentence. The results of extracting the dependent clause are then utilized for further natural language processing.

Figure 5:
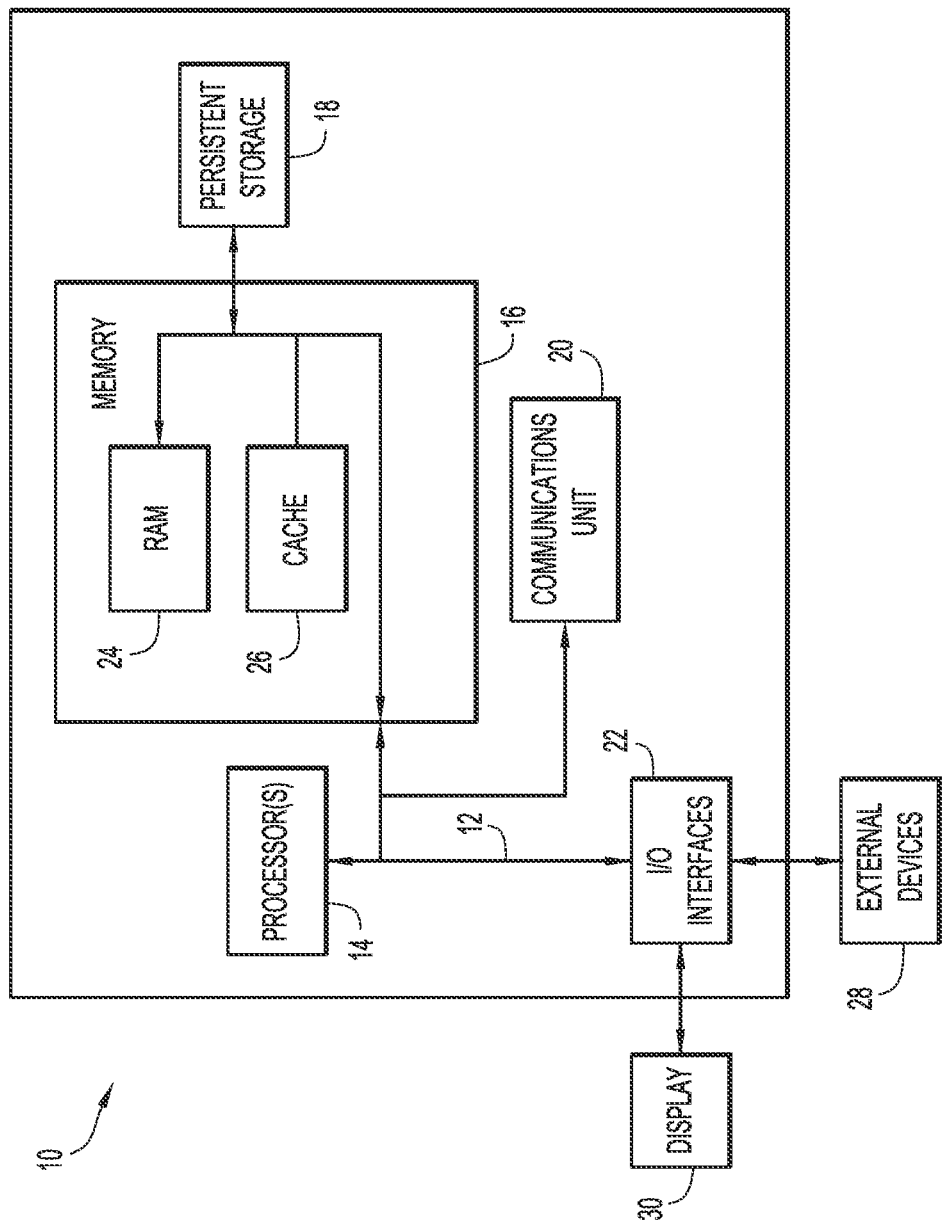
FIG. 5 is a block diagram depicting a computing device in accordance with an embodiment of the present invention.

FIG. 5 is a block diagram depicting components of a computer 10 suitable for executing the methods disclosed herein. Computer 10 may implement client device 105 and/or document server 135 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to clause extraction using machine translation (e.g., natural language samples, training data, extracted clauses, input sentences, translated sentences, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105 and/or document server 135 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to clause extraction using machine translation (e.g., natural language samples, training data, extracted clauses, input sentences, translated sentences, etc.) may include any information provided to, or generated by, client device 105 and/or document server 135. Data relating to clause extraction using machine translation may include any desired format and arrangement, and may include any quantity of any types of fields of any size to store any desired data. The data relating to clause extraction using machine translation may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to clause extraction using machine translation), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of improving natural language processing, including identifying and extracting clauses and understanding relationships between clauses.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, request processing module 115, machine translation module 120, extraction module 125, etc.). These systems may include any types of monitors and input devices (e.g., keyboard, mouse, voice recognition, etc.) to enter and/or view information.

It is to be understood that the software (e.g., communications software, server software, request processing module 115, machine translation module 120, extraction module 125, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, request processing module 115, machine translation module 120, extraction module 125, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to clause extraction using machine translation). The database system may be implemented by any number of any conventional or other databases, data stores or storage structures (e.g., files, databases, data structures, data or other repositories, etc.) to store information (e.g., data relating to clause extraction using machine translation). The database system may be included within or coupled to the server and/or client systems. The database systems and/or storage structures may be remote from or local to the computer or other processing systems, and may store any desired data (e.g., data relating to clause extraction using machine translation).

The present invention embodiments may employ any number of any type of user interface (e.g., Graphical User Interface (GUI), command-line, prompt, etc.) for obtaining or providing information (e.g., data relating to clause extraction using machine translation), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, clause extraction using machine translation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for clause extraction using machine translation, the computer-implemented method comprising:
   training a machine translation model, using machine learning, to translate an input sentence in a source language into a translated sentence in a target language and to insert a grammatical indicator into a position of the translated sentence that identifies a dependent clause, wherein the grammatical indicator is not present in the input sentence, wherein the source language includes English, wherein the machine translation model is trained using a corpus of example multi-clause sentences in the source language that each lack the grammatical indicator and corresponding translated sentences in the target language that each include the grammatical indicator, and wherein the example multi-clause sentences are not manually edited when used during training of the machine translation model;
   translating the input sentence in the source language into the translated sentence in the target language using the machine translation model;
   aligning the input sentence and the translated sentence to determine a position in the input sentence that corresponds to the position of the grammatical indicator in the translated sentence, wherein aligning comprises sequentially numbering each word in the input sentence, mapping each word of the translated sentence to a corresponding word of the input sentence, identifying a subset of words in the translated sentence based on the position of the grammatical indicator, and identifying a corresponding subset of words in the input sentence;
   translating the input sentence into at least one additional translated sentence and aligning the input sentence to the at least one additional translated sentence to verify the determined position in the input sentence; and
   extracting the dependent clause, in the source language, from the input sentence based on the determined position in the input sentence, wherein the dependent clause is extracted based on a highest-numbered word in the subset of words in the input sentence.

2. The computer-implemented method of claim 1, wherein the dependent clause is selected from a group of: a relative clause, a conditional clause, a temporal clause, an adverbial clause, an adjectival clause, and a nominal clause.

3. The computer-implemented method of claim 1, wherein the target language is selected from a group of: German, Russian, Polish, Czech, and Slovak.

4. The computer-implemented method of claim 1, wherein the dependent clause is further identified in the translated sentence by identifying a subordinating conjunction and by identifying a finite verb occupying a position immediately prior to the position of the grammatical indicator.

5. The computer-implemented method of claim 1, wherein the grammatical indicator comprises a comma.

6. The computer-implemented method of claim 1, wherein the input sentence and the translated sentence are aligned to determine the position in the input sentence that corresponds to the position of the grammatical indicator in the translated sentence using a second machine learning model that is trained to perform word alignment.

7. A computer system for clause extraction using machine translation, the computer system comprising:
   one or more computer processors;
   one or more computer readable storage media;
   program instructions stored on the one or more computer readable storage media for execution by at least one of the one or more computer processors, the program instructions comprising instructions to:
   train a machine translation model, using machine learning, to translate an input sentence in a source language into a translated sentence in a target language and to insert a grammatical indicator into a position of the translated sentence that identifies a dependent clause, wherein the grammatical indicator is not present in the input sentence, wherein the source language includes English, wherein the machine translation model is trained using a corpus of example multi-clause sentences in the source language that each lack the grammatical indicator and corresponding translated sentences in the target language that each include the grammatical indicator, and wherein the example multi-clause sentences are not manually edited when used during training of the machine translation model;

translate the input sentence in the source language into the translated sentence in the target language using the machine translation model;

align the input sentence and the translated sentence to determine a position in the input sentence that corresponds to the position of the grammatical indicator in the translated sentence, wherein aligning comprises sequentially numbering each word in the input sentence, mapping each word of the translated sentence to a corresponding word of the input sentence, identifying a subset of words in the translated sentence based on the position of the grammatical indicator, and identifying a corresponding subset of words in the input sentence;

translate the input sentence into at least one additional translated sentence and aligning the input sentence to the at least one additional translated sentence to verify the determined position in the input sentence; and extract the dependent clause, in the source language, from the input sentence based on the determined position in the input sentence, wherein the dependent clause is extracted based on a highest-numbered word in the subset of words in the input sentence.

8. The computer system of claim 7, wherein the dependent clause is selected from a group of: a relative clause, a conditional clause, a temporal clause an adverbial clause, an adjectival clause, and a nominal clause.

9. The computer system of claim 7, wherein the target language is selected from a group of: German, Russian, Polish, Czech, and Slovak.

10. The computer system of claim 7, wherein the dependent clause is further identified in the translated sentence by identifying a subordinating conjunction and by identifying a finite verb occupying a position immediately prior to the position of the grammatical indicator.

11. The computer system of claim 7, wherein the grammatical indicator comprises a comma.

12. The computer system of claim 7, wherein the input sentence and the translated sentence are aligned to determine the position in the input sentence that corresponds to the position of the grammatical indicator in the translated sentence using a second machine learning model that is trained to perform word alignment.

13. A computer program product for clause extraction using machine translation, the computer program product comprising one or more computer readable storage media collectively having program instructions embodied therewith, the program instructions executable by a computer to cause the computer to:

train a machine translation model, using machine learning, to translate an input sentence in a source language into a translated sentence in a target language and to insert a grammatical indicator into a position of the translated sentence that identifies a dependent clause, wherein the grammatical indicator is not present in the input sentence, wherein the source language includes English, wherein the machine translation model is trained using a corpus of example multi-clause sentences in the source language that each lack the grammatical indicator and corresponding translated sentences in the target language that each include the grammatical indicator, and wherein the example multi-clause sentences are not manually edited when used during training of the machine translation model;

translate the input sentence in the source language into the translated sentence in the target language using the machine translation model;

align the input sentence and the translated sentence to determine a position in the input sentence that corresponds to the position of the grammatical indicator in the translated sentence, wherein aligning comprises sequentially numbering each word in the input sentence, mapping each word of the translated sentence to a corresponding word of the input sentence, identifying a subset of words in the translated sentence based on the position of the grammatical indicator, and identifying a corresponding subset of words in the input sentence;

translate the input sentence into at least one additional translated sentence and aligning the input sentence to the at least one additional translated sentence to verify the determined position in the input sentence; and extract the dependent clause, in the source language, from the input sentence based on the determined position in the input sentence, wherein the dependent clause is extracted based on a highest-numbered word in the subset of words in the input sentence.

14. The computer program product of claim 13, wherein the dependent clause is selected from a group of: a relative clause, a conditional clause, a temporal clause an adverbial clause, an adjectival clause, and a nominal clause.

15. The computer program product of claim 13, wherein the target language is selected from a group of: German, Russian, Polish, Czech, and Slovak.

16. The computer program product of claim 13, wherein the dependent clause is further identified in the translated sentence by identifying a subordinating conjunction and by identifying a finite verb occupying a position immediately prior to the position of the grammatical indicator.

17. The computer program product of claim 13, wherein the input sentence and the translated sentence are aligned to determine the position in the input sentence that corresponds to the position of the grammatical indicator in the translated sentence using a second machine learning model that is trained to perform word alignment.

* * * * *